UNITED STATES PATENT OFFICE.

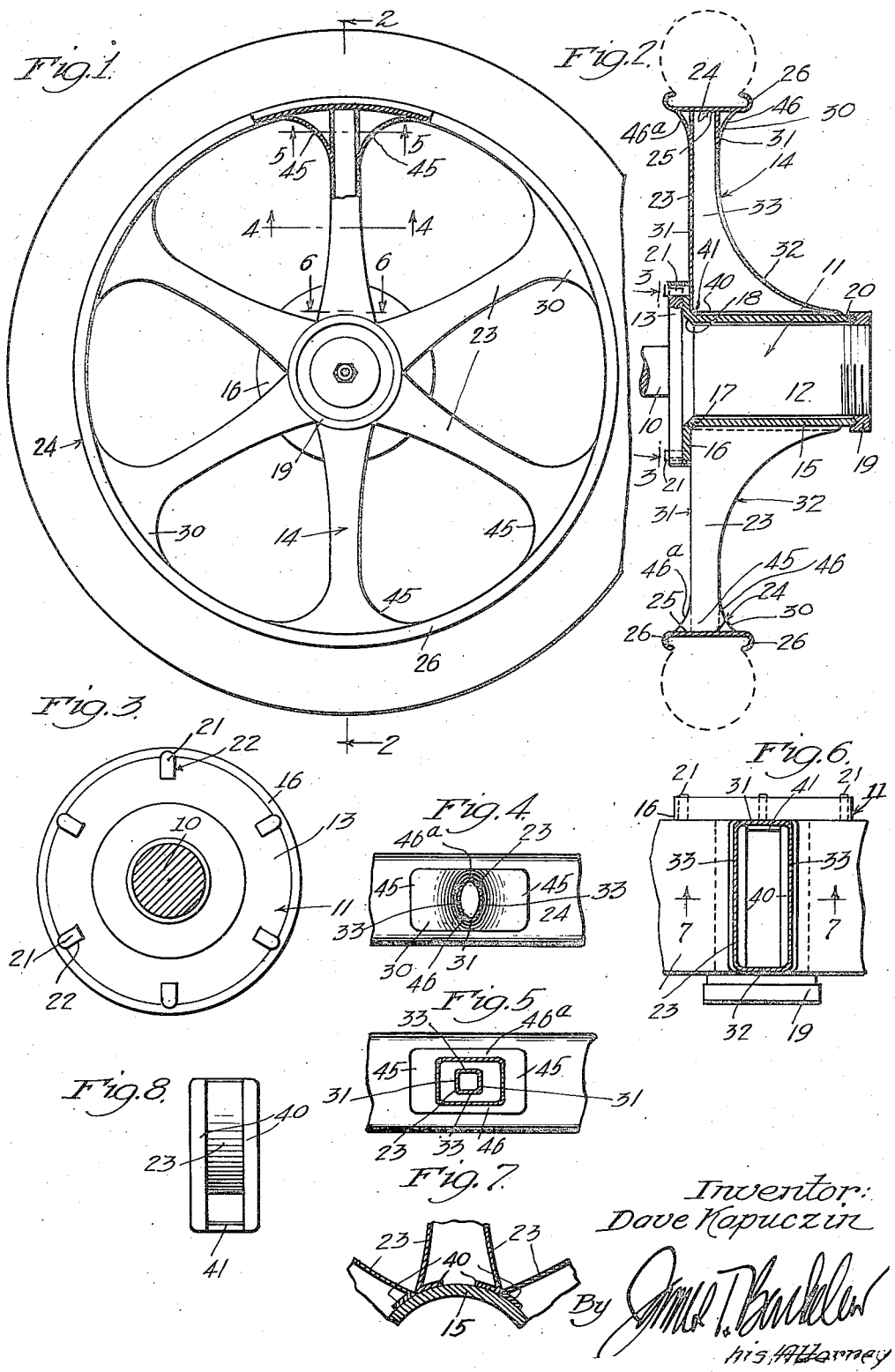

DAVE KAPUCZIN, OF LOS ANGELES, CALIFORNIA.

WHEEL.

1,413,030. Specification of Letters Patent. Patented Apr. 18, 1922.

Application filed July 3, 1920. Serial No. 393,774.

*To all whom it may concern:*

Be it known that I, DAVE KAPUCZIN, a citizen of the United States, residing at Los Angeles, in the county of Los Angeles, State of California, have invented new and useful Improvements in Wheels, of which the following is a specification.

This invention has to do with wheels, such, for instance, as are used on automobiles and other vehicles, and an object of the invention is to provide a metallic wheel structure of this general character which is strong and durable and which may be inexpensively manufactured.

The wheel provided by the present invention is particularly adapted for use on motor vehicles such as motor cars, motor trucks, etc., but it will be understood that the invention is not in any way limited to use or application in any one particular connection as it may be advantageously employed in various and numerous connections. For the sake of simplicity and for purpose of illustration the invention is being herein set forth as applied to a motor vehicle wheel and the particular design and proportions herein shown and specified are merely those desirable, or which may be well used, in the construction of this particular type of wheel.

A noteworthy object of the invention is to provide metallic wheels possessing the desirable characteristics of wooden wheels and also metal wheels, such as are commonly known as wire wheels. The present wheel possesses the strong and sturdy characteristics of a wooden wheel and the flexible or resilient and durable characteristics of a wire wheel.

A feature of the invention is the sightly, simple construction of the wheel which makes it desirable for use and of commercial value.

There are other objects and features of the invention which will be best understood from the following detailed description of a typical preferred form of the invention, throughout which reference is had to the accompanying drawings, in which—

Figure 1 is a side elevation of the wheel; Fig. 2 is a detailed sectional view of the wheel taken as indicated by line 2—2 on Fig. 1, one of the spokes being shown in elevation instead of in section; Fig. 3 is an enlarged view taken as indicated by line 3—3 on Fig. 2; Fig. 4 is a detail sectional view taken as indicated by line 4—4 on Fig. 1; Fig. 5 is a detail sectional view taken as indicated by line 5—5 on Fig. 1; Fig. 6 is a detail sectional view taken as indicated by line 6—6 on Fig. 1; Fig. 7 is a detail sectional view taken as indicated by line 7—7 on Fig. 6; and Fig. 8 is a view of the inner end of one of the spokes.

Throughout the drawings numeral 10 designates an axle or spindle on which is mounted a suitable bearing 11, having a cylindrical casing portion 12 at the inner end of which is a radially disposed flange 13. The wheel 14, provided by the present invention, is adapted to be mounted or carried on the bearing 11. In the particular mounting arrangement shown in the drawings the hub 15 of the wheel is formed to fit over the cylindrical casing 12 until the flange 16 formed at its inner end engages the flange 13. The bearing is formed with a beveled portion 17 between the cylindrical casing 12 and the flange 13, which is engaged by a similarly beveled portion 18 formed on the hub 15. In practice the hub 15 is formed to fit comparatively loosely over the cylindrical casing 12 so that it is not carried on, or does not bear on, the cylindrical portion of the casing but is supported by the cooperation of the beveled portions 17 and 18 and by the retaining nut 19. The retaining nut 19 screw threads onto the outer end of the cylindrical casing 12 and is formed with a suitable V-shaped groove 20 which receives the outer end edge of the hub 15 in the manner clearly shown in Fig. 2 of the drawings. This particular manner of mounting the wheel on the spindle is particularly simple and effective and at the same time prevents the wheel from jamming or sticking on the bearing 11, it being necessary only to remove the retaining nut 19 when it is desired to remove the wheel. To lock the casing 12 and flange 13 against relative movement with the hub 15 a plurality of lugs 21 are arranged to extend from the flange 16 into suitable sockets 22 formed in the flange 13. Herein so far I have merely set forth a form of wheel mounting which may be advantageously employed in connection with the wheel provided by the present invention. This particular form of wheel mounting is merely set forth for the purpose of illustrating the manner in which a simple and easily manipulated form of wheel mounting may be employed in connection with the wheel and is not intended to in any way limit or restrict the present invention to such a specific form of construction as it will be readily seen and understood how various and numerous forms and types of wheel mountings may be advantageously employed in its place.

The wheel 14, it may be stated, comprises generally the hub 15, a plurality of spokes 23 arranged to extend radially from the hub 15, and a rim 24 supported or carried by the spokes 23 to be concentric with the hub 15. The hub 15, hereinabove referred to, is a straight cylindrical member fitting over the bearing 12 and is formed at its inner end with a radially disposed flange 16. The hub 15 is preferably formed of a single piece of material, although it will be understood how it might advantageously be built up of a plurality of pieces of material.

The rim 24 is a continuous metal rim representing a substantially straight or smooth inner face 25 and formed at its edges or sides with outwardly extending curved flanges 26 adapted to receive and hold the beads of a tire, or like structure, which may be desired on the wheel. It will be understood, of course, that this particular form or type of rim is merely illustrative of the type of rim which may be provided on the wheel and it may be stated that this particular simple form of construction is not intended to limit the scope of the invention as it is apparent that the member 24 may be of a form and construction to act as a felly to support a rim rather than a rim itself.

The spokes 23, of which there may be any desired or suitable number, and which, it will be understood, may be made in various proportions and designs, are hollow pressed sheet metal structures each provided at its outer end with a foot 30, which engages and is secured to the inner face 25 of rim 24. Each spoke is preferably formed of sheet metal by suitable stamping or pressing and is welded or fused together at the joints, or points of connection, to form a solid continuous hollow structure. It will be readily understood how each spoke can be formed of a suitably shaped piece of sheet metal, preferably steel, formed or pressed to form a cylindrical body and welded together where its edges come together, thereby forming a continuous hollow pressed metal member. At the inner ends of the spokes, or where the spokes engage, or connect with the hub 15, they are rectangular in cross sectional configuration, having only slightly rounded corners. The inner wall 31 of each spoke extends straight radially outward from the flange 16 to the rim 24 while the outer wall 32 is curved, as clearly shown in Fig. 2 of the drawings, to extend from the rim 24 to the extreme outer end portion of the hub 15. The two side walls 33 of the spokes are only slightly curved and are relatively positioned so that they converge outwardly from the hub 15, as clearly shown in Fig. 1 of the drawings. In practice, the spokes are sufficiently wide at their inner ends to cause the side walls 33 of adjacent spokes to abut at the hub 15 in the manner shown in Figs. 1 and 7, at which points they are welded together and to the hub.

Although various methods might be employed to secure the spokes to the hub 15 it is preferred that they be welded or fused to the hub as such manner of connection is positive, neat and durable. To permit of the spokes being effectively and properly welded to the hub 15 the side walls 33 are formed at their innermost ends with inwardly extending flanges 40 and the inner walls 33 are formed at their innermost edges or ends with suitable inwardly extending flanges 41. Due to the manner in which the outer walls 32 engage the hub 15 it is not necessary, in fact it would not be desirable, to form a flange on these walls.

As the spokes extend outwardly from the hub 15 their corners become more curved until, near their middle portion, they become very elliptical in cross sectional configuration, as is clearly illustrated by Fig. 4 of the drawings.

At the outermost ends of the spokes they are preferably connected to the rim 24 by welding and are braced or reinforced by the feet 30. Each foot 30 is preferably formed of sheet metal to have outwardly curving side walls 45 and outwardly curving front and rear walls 46 and 46$^a$. The corners between the side walls and front and rear walls are preferably suitably curved for purpose of sightliness and strength. The joints between the walls of the feet and the walls of the spokes are preferably welded. This manner of mounting the feet on the spokes is particularly simple and effective and the provision of feet on the spokes permits of them being securely and effectively attached to the rim 24. The feet of course are shaped to accurately engage the inner face 25 of the rim 24 and are preferably secured to the rim by welding, thereby forming rigid braces or reinforcement for the spokes.

From the foregoing description it will be readily understood how the spokes 23 are positively and securely attached to the hub 15 against displacement from, or on, the hub due to the welded joints between the spokes and the hub and also due to the fact that adjacent side walls of adjacent spokes abut and are welded together where the spokes join the hub. Further, it will be understood how the spokes are rigidly and securely connected to the rim 24 by the welded joints between them and the rim and by the provision of the feet 30.

Having set forth a preferred embodiment of the invention I do not wish to limit or restrict myself to the particular details hereinabove set forth but wish to reserve to myself any changes or variations that may appear to those skilled in the art or that may fall within the scope of the following claims.

Having thus described my invention, what I claim is:

1. In a wheel of the character described, a hub, a rim, and a plurality of hollow spokes extending between the hub and rim, the spokes having inwardly extending flanges secured to the hub forming connections between the spokes and hub and allowing the inner ends of the spokes to abut at the hub.

2. In a wheel of the character described, a hub, a rim, and a plurality of hollow spokes extending between the hub and rim, the spokes being welded together at the hub and each having an inwardly extending flange welded to the hub.

3. In a wheel of the character described, a hub, a rim, a plurality of spokes extending between and welded directly to the hub and rim and welded together at the hub, a flange extending inwardly from each spoke at the hub, the flanges being welded to the hub, and feet welded to the rim and to the outer portions of the spokes at points spaced from the rim.

4. In a wheel of the character described, a hub, a rim, and a plurality of spokes extending between the hub and rim, each spoke having one outer wall straight and extending from one end of the hub to the rim, and having the other outer wall curved and extending from the other end of the hub toward the other wall and to the rim.

DAVE KAPUCZIN.